US 6,704,313 B1

(12) United States Patent
Duret et al.

(10) Patent No.: US 6,704,313 B1
(45) Date of Patent: Mar. 9, 2004

(54) METHOD OF ASSOCIATING FORWARDING REFERENCES WITH DATA PACKETS BY MEANS OF A TRIE MEMORY, AND PACKET PROCESSING DEVICE APPLYING SUCH METHOD

(75) Inventors: Christian Duret, Chatillon (FR); Joel Lattmann, Champs sur Marne (FR); Servane Bonjour, Acigné (FR); Herve Guesdon, Malakoff (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/493,583

(22) Filed: Jan. 28, 2000

(30) Foreign Application Priority Data

Feb. 12, 1999 (FR) .............................................. 99 01714

(51) Int. Cl.⁷ .......................... H04L 12/28; H04L 12/56
(52) U.S. Cl. ...................... 370/392; 370/401; 711/216; 712/17
(58) Field of Search ................................ 370/254, 256, 370/363, 368, 392, 389, 393, 395.32, 392.52; 711/216

(56) References Cited

U.S. PATENT DOCUMENTS

| | | | | |
|---|---|---|---|---|
| 5,509,006 A | * | 4/1996 | Wilford et al. | 370/401 |
| 5,781,431 A | * | 7/1998 | Duret et al. | 714/811 |
| 5,938,736 A | * | 8/1999 | Muller et al. | 709/243 |
| 6,041,053 A | * | 3/2000 | Douceur et al. | 370/389 |
| 6,157,641 A | * | 12/2000 | Wilford | 370/389 |
| 6,243,667 B1 | * | 6/2001 | Kerr et al. | 703/27 |

FOREIGN PATENT DOCUMENTS

| | | |
|---|---|---|
| EP | 0 380 294 | 8/1990 |
| FR | 2 707 775 | 1/1995 |
| WO | WO 96/00945 | 1/1996 |
| WO | WO 98/27662 | 6/1998 |

OTHER PUBLICATIONS

Fredkin (Communications of the ACM) discloses Trie memory techniques.*

Srinivasan V. et al., <<Fast and scalable layer four switching>>, ACM SIGCOMM '98 Conference. Applications, Technologies, Architectures, And Protocols For Computer Communication, Vancouver, BC, Canada, Sep. 2–4, 1998, vol. 28, No. 4, pp. 191–202.

Pei T.–B. et al., <<Putting Routing Tables in Silicon>>, IEEE Network Magazine, Jan., 1992, vol. 6, pp. 42–50.

Doeringer W. et al., <<Routing on Longest–Matching Prefixes>>, IEEE Transactions on Networking, Feb. 1996, vol. 4, No. 1, pp. 86–97.

(List continued on next page.)

Primary Examiner—Ricky Ngo
Assistant Examiner—Yvonne Q. Ha
(74) Attorney, Agent, or Firm—Gardner Carton & Douglas LLP (57) ABSTRACT

Different portions of a header of each packet containing protocol data are analyzed in succession from different gate registers of the TRIE memory. As a packet arrives, its header is stored in a buffer memory and a first portion of the stored header is analyzed. Each analysis of a portion of header produces either the forwarding reference associated with the packet or an intermediate reference containing a first code, making it possible to locate at an arbitrary location of the buffer memory a next portion to be analyzed, and a second code, making it possible to locate at an arbitrary location of the TRIE memory a gate register from which this next portion is to be analyzed. Having analyzed the first portion of a stored header, the subsequent portions thereof are analyzed in accordance with the first and second codes contained in the intermediate references produced in succession until the forwarding reference is produced.

14 Claims, 4 Drawing Sheets

OTHER PUBLICATIONS

Degermark M. et al., <<Small Forwarding Tables for Fast Routing Lookups >>, SIGCOMM '97, Cannes, France, 1997 ACM 0–89791–905–X/97/0009 . . . , pp. 3–14.

Waldvogel M. et al., <<Scalable High Speed IP Routing Lookups>>, SIGCOMM '97, Cannes, France, 1997 ACM 0–89791–905–X/97/0009 . . . , pp. 25–36.

Fredkin E., <<Trie Memory >>, Communications of the ACM, vol. 3, No. 9, Sep. 1960, pp. 490–499.

Dittia Z.D. et al., <<Overview of Session 5 : Hardware Issues in ATM+IP Networks>>, Report on IP+ATM Session 5 : Hardware Issues, Jan. 1997, pp. 1–6, zubin@dworkin.wustl.edu.

* cited by examiner

METHOD OF ASSOCIATING FORWARDING REFERENCES WITH DATA PACKETS BY MEANS OF A TRIE MEMORY, AND PACKET PROCESSING DEVICE APPLYING SUCH METHOD

BACKGROUND OF THE INVENTION

The present invention relates to associative memories and in particular memories of the <<TRIE>> type (derived from the English verb <<reTRIEve>>).

The principle of the <<TRIE>> memory was proposed by R. de la Briandais and E. Fredkin et al towards the end of the 1950s (see E. Fredkin et al.: <<Trie Memory>>, Communications of the ACM, Vol. 3, No. 9, September 1960, pages 490–499). It consists in cutting up the bit strings to be recognised into successive slices of a fixed length (of K bits) and integrating them in a two-dimensional table T. Each row of the table constitutes a register of $2^K$ elementary cells. A register (R) is assigned to each slice of the string and a cell in the register is associated with the value (V), ranging between 0 and $2^K-1$ of this slice. The contents (C=T[R,V]) of the cell determined in this manner represent either the register allocated to the subsequent slice (or pointer) or an end of analysis reference (or <<status>>) if the analysis of the string must end on this slice.

The register allocated to the first slice of the string, which is also the point of entry to the table, is also referred to as the gate. The data to be analysed in the form of bit strings, i.e. to be compared with the contents of the TRIE memory, will also be referred to as routes hereafter. The term path will be used to denote the succession of concatenated cells in the table associated with a route. Each register of the table will be said to be of the order of $i \geq 0$ if it is attributed to the (i+1)-th slice of one or more stored routes. The gate register will therefore be in the order of 0. The TRIE memory associates with each of the registers in the order of $i \geq 0$ a unique sequence of iK bits corresponding to the iK first bits of each route whose path in the table passes via a cell of the register in question.

The following example will provide an illustration of how data is stored in a TRIE memory in the specific case where K=4. The value of each slice is represented by a digit in hexadecimal numbering (0,1, . . . E,F) and each of the registers contains $2^4=16$ cells.

Figure 1:
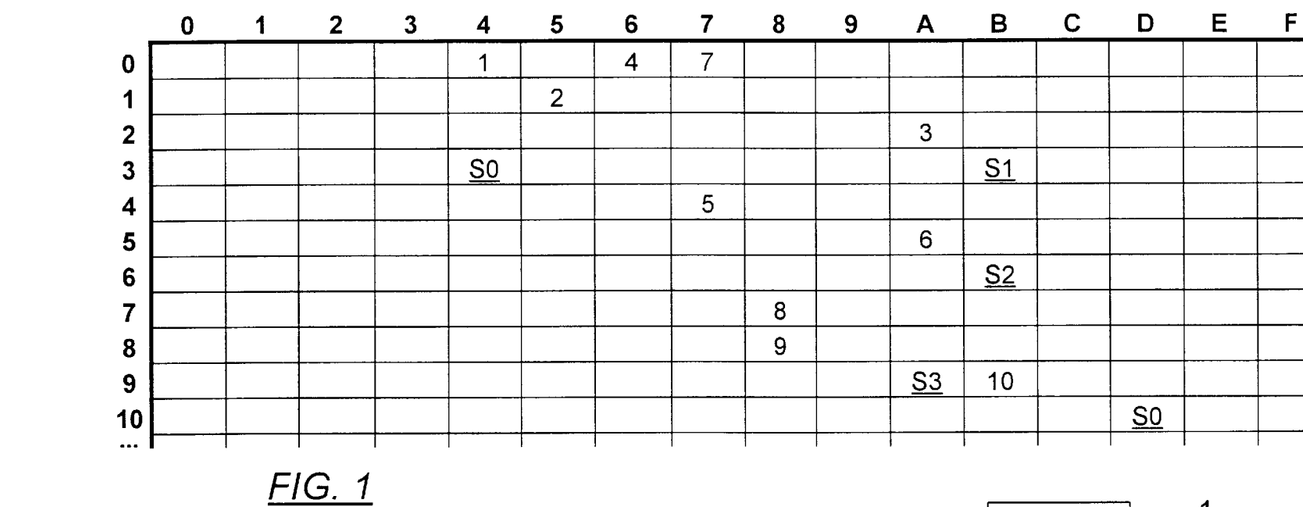
FIG. 1, discussed above, shows an example of the contents of a TRIE memory.

Let us assume that the routes to be recognised are those commencing with the codes 45A4, 45AB, 67AB, 788A and 788BD, to which the statuses S0, S1, S2, S3 and S0 have been allocated respectively (a same status may be shared by several routes). By using the row index for the register R and the column index for the value V of the slices and by taking the register $R_0=0$ as the gate, the table of the TRIE memory will appear as illustrated in FIG. 1, the underlined data being the statuses. The codes 45A4, 45AB, 67AB, 788A and 788BD are represented respectively in the table of FIG. 1 by the paths:

T[0,4]→T[1,5]→T[2,A]→T[3,4];
T[0,4]→T[1,5]→T[2,A]→T[3,B];
T[0,6]→T[4,7]→T[5,A]→T[6,B];
T[0,7]→T[7,8]→T[8,8]→T[9,A];
T[0,7]→T[7,8]→T[8,8]→T[9,B]→T[10,D].

From this example, it may be seen that all the codes starting with a common part of iK bits are represented by a common initial path in the memory leading to the register of order i with which the sequence formed by these iK bits is associated.

Figure 2:
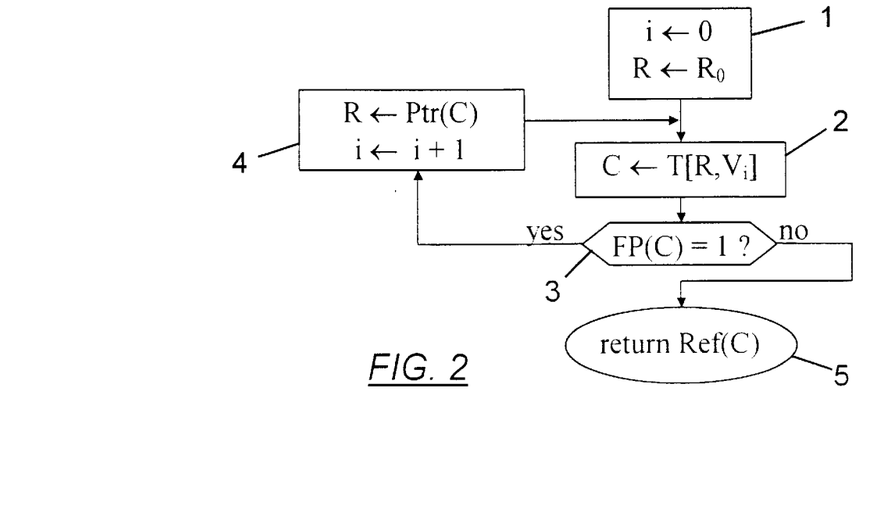
FIG. 2, discussed above, is a flow chart illustrating a conventional analysis method run as a means of looking up the TRIE memory.

If we consider a route to be analysed, cut up into a series of binary slices of values $V_i$ where $0 \leq i \leq N$ and $\{R_i\}$ is the series of registers associated with the values $V_i$, where $R_0$ still denotes the gate register, the analysis algorithm implemented may be that illustrated in FIG. 2.

On initialisation 1 of this algorithm, the analysis rank i is set to 0 and the gate register $R_0$ is selected as the register R. In each iteration of rank i, the contents C of the cell $T[R,V_i]$, denoted by the (i+1)-th slice $V_i$ of the route in the register of order i selected, is read at step 2. If this cell contains a continue analysis pointer, which is indicated at test 3 by the value 1 for a bit FP(C) stored in the cell, the register of order i+1 denoted by this pointer Ptr(C) is selected as the register R for the next iteration at step 4 and the rank i is incremented. If test 3 reveals a cell which does not contain a pointer (FP(C)=0), the status Ref(C) read in the cell concerned is returned at step 5 as a result of looking up the table.

This algorithm enables routes containing any number of slices to be analysed. A same table may be used for several types of analysis, managing data on the basis of different gates. Furthermore, it enables the analysis time of the data to be controlled: analysing a number N of slices of K bits will require at most N times the duration of one iteration.

The algorithm of FIG. 2 may be implemented very rapidly by a hardware component managing accesses to the table memory. In particular, it will enable high-performance routers to be set up for packet-switched telecommunications networks. The header of the packets is analysed by the component on the fly and the status associated with a route designates, for example, an output port of the router to which the packets bearing a destination address conforming to this route must be routed.

Such a router may be a multi-protocol router. This being the case, the different sections of the header are analysed from different gates. For example, a first analysis of a header field (or several) indicating the protocol used and/or the version of this protocol may be analysed from a first gate. This first analysis will provide a reference which, although corresponding to a logical end of the analysis, may be embodied in the TRIE memory by a continue analysis pointer denoting another gate register to be used for analysing the rest of the header. The reference in question may also trigger time delays or skips by a given number of bits in the header being analysed in order to be able to choose which portion of the header should be analysed next. In practice, a certain number of analyses are generally run in succession in order to trigger the operations required by the protocols supported, depending on the content of the headers. One of these analyses will relate to the destination address needed to complete the routing function strictly speaking.

A router of the type outlined above is described in U.S. Pat. No. 5,781,431. On the subject of using a TRIE memory in routers, reference may be made to the article <<Putting Routing Tables in Silicon>> by T. B. Pei et al., IEEE Network Magazine, January 1992, pages 42–50.

The fact of being able to string together several elementary analyses and insert programmable skips between them lends a high degree of flexibility to the method, particularly when processing encapsulated protocols of the ISO model in several layers. Analysing slices of the header on the fly as they arrive also enhances speed.

However, in a certain number of situations, it is useful to be able to move backward in the header in order to examine certain fields in an order other than that in which they arrived. This will often allow better optimisation of the memory size required. It is also a feature required by certain protocols, such as the RSVP reservation protocol or multicast protocols.

An object of the present invention is to further improve the processing flexibility offered by TRIE memories, especially in routing applications.

SUMMARY OF THE INVENTION

Accordingly, the invention proposes a method of associating forwarding references with data packets by means of a TRIE memory, whereby different gate registers of the TRIE memory analyse in succession different portions of a header of each packet containing protocol data. When a packet arrives, its header is stored in a buffer memory and a first portion of the stored header is analysed. Each analysis of a header portion of a packet produces either the forwarding reference associated with the packet or an intermediate reference containing a first code, which makes it possible to locate at an arbitrary location of the buffer memory a subsequent portion to be analysed, and a second code, which makes it possible to locate at an arbitrary location of the TRIE memory a gate register from which said subsequent portion should be analysed. Having analysed the first portion of a stored header, the subsequent portions thereof are analysed in accordance with the first and second codes contained in the intermediate references produced in succession until the forwarding reference is obtained.

Consequently, the contents of the TRIE memory no longer represent only the reference associated with the packet headers as such. They also incorporate a programme consisting of the string of elementary analyses to be performed, depending on the different configurations taken into account by the memory. These strings are entirely programmable insofar as the user can define, arbitrarily and at each step of the process, which portion of the header must be examined and from which register of the TRIE memory.

Another aspect of the present invention relates to a packet processing device such as a packet router having a circuit for analysing the header of the packets received using an associative memory of the TRIE type which operates in accordance with the method outlined above.

DESCRIPTION OF PREFERRED EMBODIMENTS

As a means of illustrating the description below, we will look at a situation in which the packets routed by the router proposed by the invention are transported on an asynchronous transfer mode (ATM) network and it will be assumed that the header of each packet is always contained in one ATM cell.

Figure 3:
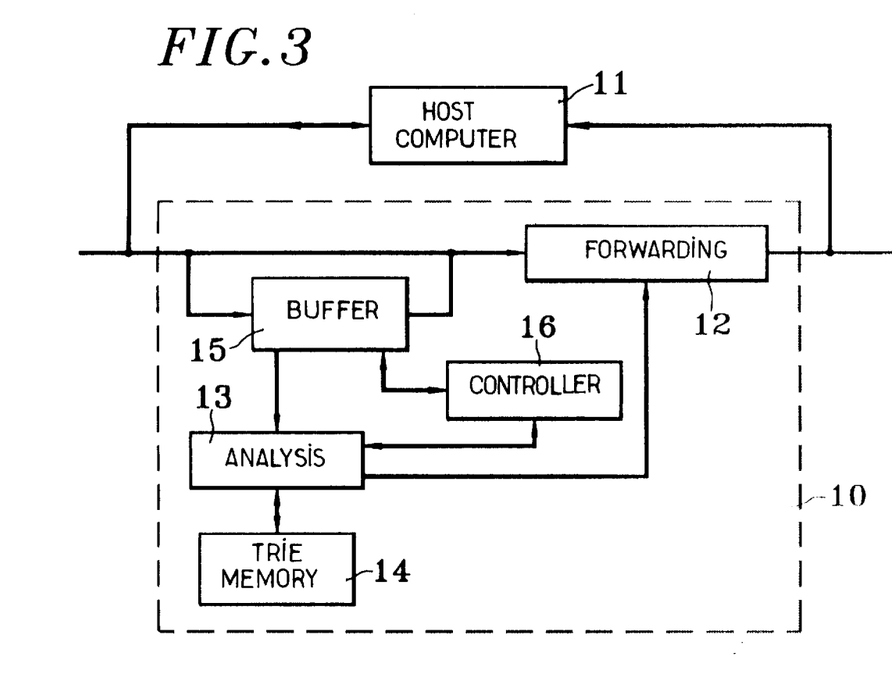
FIG. 3 is a block diagram of a packet router as proposed by the invention

The router 10 illustrated in FIG. 3 operates in conjunction with a host computer 11. The host computer 11 can transmit and receive packets, in particular for managing the routing process. To this end, it has a virtual channel (VC) at the input and output of the router 10.

The router 10 has a forwarding module 12 which forwards the packets received in accordance with instructions, referred to hereafter as <<forwarding references>> or <<final status>>, produced by an analysis module 13 from an memory 14 organised as a TRIE memory table. In the case of an ATM network equipment, the forwarding module 12 may perform essentially a translation of the virtual path and channel identifiers VPI/VCI (<<Virtual Path Identifier/Virtual Channel Identifier>>), virtual channel merger in the virtual paths, and delivery of packets to the output ports of the device. To this end, it needs to know the VPI/VCI pairs of the outgoing packets, which may constitute the forwarding references stored in the TRIE memory 14.

Each ATM cell containing the header of the packet to be routed passes via a buffer memory 15, to which the analysis module 13 has access in order to analyse portions of these headers by means of the TRIE Memory 14. This analysis is performed by quartets (K=4), for example.

Configuring the router 10 consists in storing the relevant data in the TRIE memory 14. This operation is performed by a module (not shown) which manages the TRIE memory under the control of the host computer 11. The configuration commands may be received in packets transmitted across the network and addressed to the router 10. For details on how the contents of the TRIE memory 14 can be dynamically managed, reference should be made to co-pending U.S. patent application Ser. No. 09/395,673 which is incorporated herein by reference.

In the case of the router illustrated in FIG. 3, the analysis module 13 co-operates with a controller 16 programmed to run certain checks and apply actions to the packet headers, depending on of the communication protocols supported by the router. Outside of this controller 16, operation of the router 10 is independent of the packet transport protocols.

Figure 4:
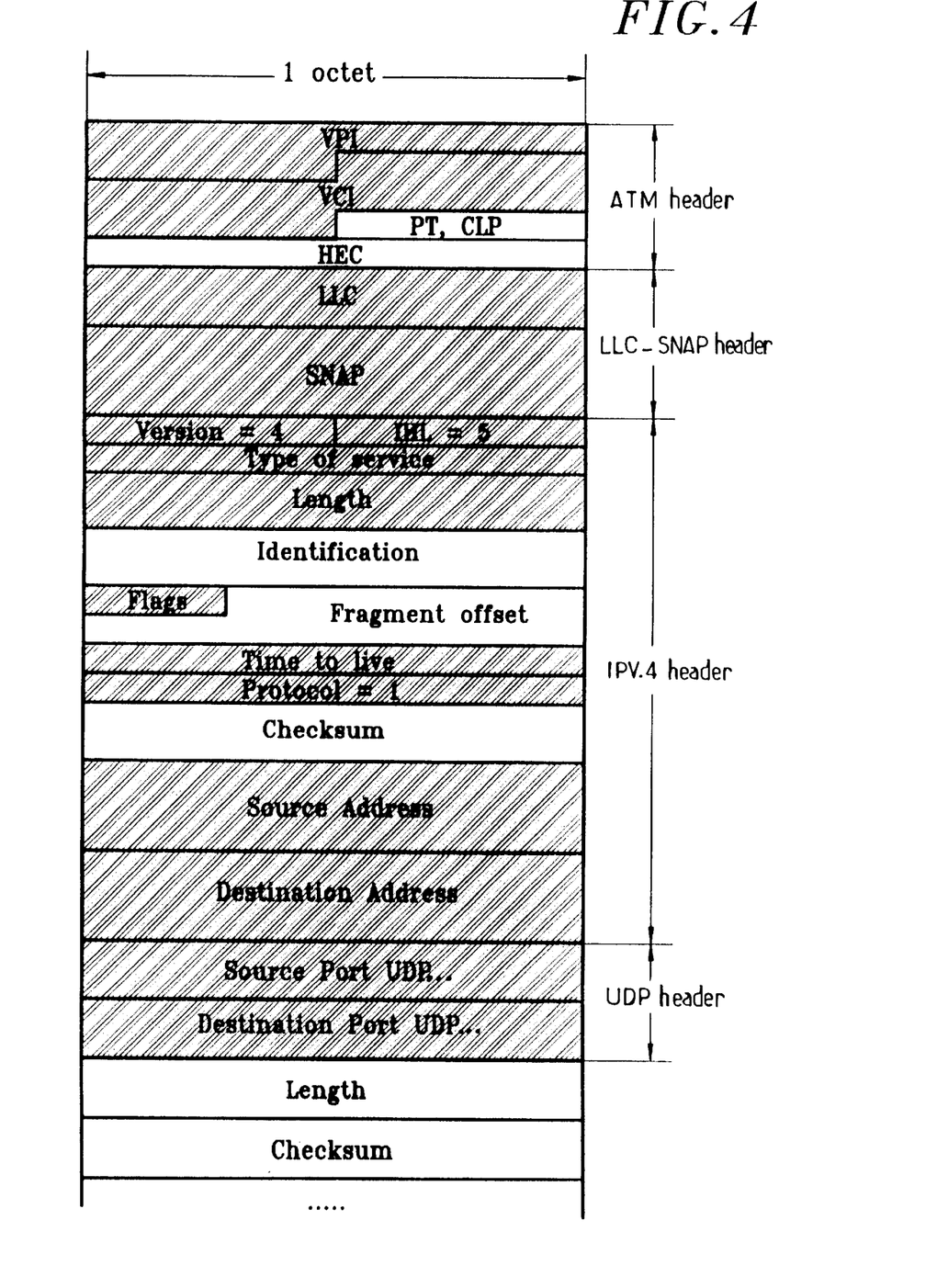
FIG. 4 is a diagram showing the structure of an example of a packet header.

FIG. 4 illustrates a specific example of a header structure for a packet that can be processed by the router of the invention. In this example, the packet is an IPV4 packet (<<Internet Protocol-Version 4>>) carrying the UDP application protocol (<<User Datagram Protocol>>), encapsulated in the ATM cells by means of a LLC-SNAP layer 2 protocol (<<Logical Link Control—Sub Network Access Protocol>>). The field names indicated in the drawing are those used in the relevant specifications pertaining to these protocols. The global header to be analysed consists of an interleaved arrangement of the five octet header of the ATM cell, the LLC-SNAP header, the header of the IPV4 protocol and its UDP extension.

Other types of protocol and encapsulation may be supported by the router 10. For example, it is also possible to handle the PPP protocol (<<point-to-point Protocol>>) instead of the SNAP protocol at layer 2 or alternatively the MPLS scheme (<<Multi-Protocol Label Switching>>) at layer 2 and/or layer 3. Under these conditions, the following series of header types are likely to be encountered in the AAL5 frame (<<ATM Adaptation Layer No. 5>>) following the header of the ATM cell:

IP

IP, IP

LLC-SNAP, IP

LLC-PPP, IP

MPLS

MPLS, . . . MPLS

LLC-SNAP, MPLS

MPLS, IP

MPLS, . . . MPLS, IP

MPLS, LLC-SNAP, IP

MPLS, . . . , MPLS, LLC-SNAP, IP where IP denotes either version 4 or version 6 of the Internet Protocol and the headers of layers beyond the network layer (TCP, UDP . . . ).

In the specific case of LLC-SNAP/IPV4/UDP, the hashed areas of FIG. 4 show the header fields which may be relevant to the routing operation. Depending on the type of routing applied, some of these fields may be disregarded, along with the non-hashed fields illustrated in the drawing. In order to avoid increasing the size of the TRIE memory unnecessarily, the content of these fields is simply ignored during the analysis process.

The analysis therefore focuses on different portions of the header which will be successively subjected to partial analysis to supply intermediate references until the final portion is reached for which the TRIE memory 14 supplies the forwarding reference destined for the module 12.

The method proposed by the invention allows the header fields to be analysed in any order. This is useful in a certain number of situations where it is not sufficient to analyse the fields in the order in which they appear. It should be pointed out, for example, that:

it is of interest to analyse the TOS field (Type of Service) of the IP header after the destination address although these fields appear in the reverse order, so as to limit the required memory size;

with reservation protocols of the RSVP type, it is necessary to be able to go back to the <<Protocol>> and <<destination address>> fields of the IP header after analysing the layer 4 header;

in multicast applications, it is important to be able to go back to the TTL (Time to Live) field of the IP header and to the VPI/VCI identifiers of the router input in the ATM header so as to prevent the occurrence of looping between several network nodes . . .

Organisation of the data in the TRIE memory 14 and the way in which they are looked up is adapted to make it possible to programme any skips that might be needed between the header fields being analysed and between the gate registers of the TRIE memory.

Figure 5:
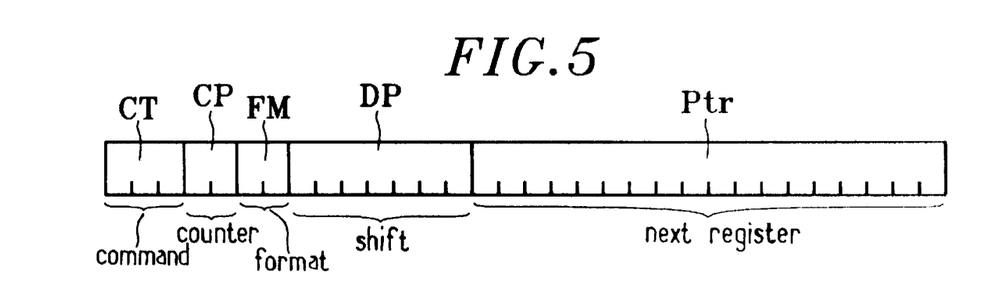
FIGS. 5 and 6 are diagrams showing the structure of cells in the TRIE memory of the router.
Figure 6:
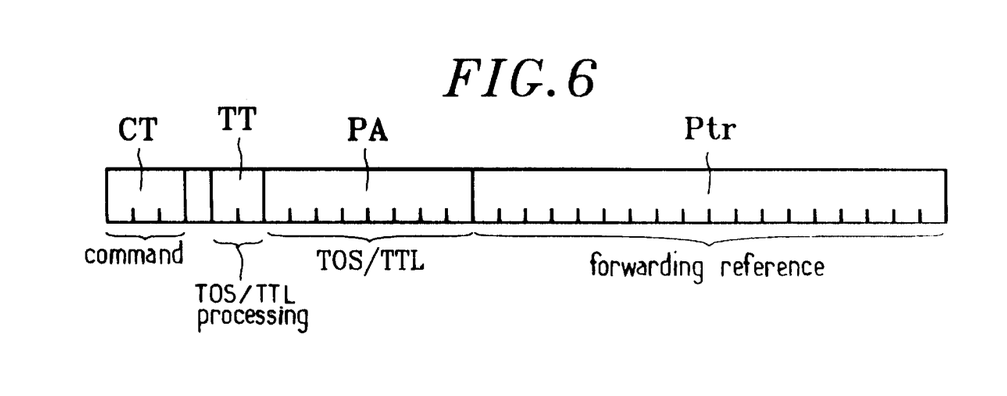

In a specific embodiment, FIGS. 5 and 6 illustrate the structure of data contained in the non-empty elementary cells of the TRIE memory 14. In this example, each elementary cell represents a 32 bit memory zone. The first three bits of the cell in the TRIE memory form a command field CT for controlling the state of the controller 16.

By way of example, the controller 16 may have 5 states:

<<inactive>> if no header is present in the buffer memory 15;

<<ATM>> if the module 13 is in the process of analysing the VPI/VCI identifiers of the ATM header;

<<MPLS>> if the module 13 is in the process of analysing a MPLS header;

<<IP>> if the module 13 is in the process of analysing an IP header or its extensions;

<<other>> if the module 13 is in the process of analysing another type of header (LLC, SNAP, PPP, . . . ).

The command field CT of the elementary cells of the TRIE memory is coded, for example, as follows:

CT=000: controller state unchanged,

CT=001: end of analysis,

CT=01a: transition to the <<other>> state,

CT=10a: transition to the <<IP>> state,

CT=11a: transition to the <<MPLS>> state.

The above bit a indicates whether or not the frame has come from the host computer 11 so that the controller 16 can inhibit processing of the TTL and <<checksum>> fields of the IPV4 header if necessary.

In the examples illustrated in FIGS. 5 and 6, the eighteen least significant bits of the elementary cell of the TRIE memory form a field Ptr containing either a pointer to the next register of the TRIE memory from which analysis should be continued (gate register or not) in the case of FIG. 5 or the forwarding reference destined for the module 12 in the example illustrated in FIG. 6.

In the latter case, the command field CT contains 001 since issuing the forwarding reference terminates the analysis process using the TRIE memory.

In the situation illustrated in FIG. 5, the pointer contained in the field Ptr may indicate the continue analysis register directly or indirectly depending on what is contained in a two bit counting field CP. A counter may be allocated to every cell of the TRIE memory. This counter will then be incremented every time this cell is encountered in the path followed during the analysis. Each counter V(A) is placed in a memory location coupled with another location containing a pointer PT(A) to a continue analysis register in the TRIE memory.

If the counting field CP contains something other than 00, the field Ptr of the TRIE memory cell contains the address of the memory location at which the relevant counter V(A) is stored and the location PT(A) coupled with this latter contains the pointer to the register in the TRIE memory which must be used to continue the analysis. If the two bits of the field CP are 00, the field Ptr of the elementary cell will point directly to the continue analysis register in the TRIE memory.

In order to indicate which portion of the packet header should be analysed next, the elementary cell which does not contain a forwarding reference (FIG. 5) includes a two bit format field FM and a seven bit shift field DP. The field FM indicates the format of the numerical representation of the relevant location in the buffer memory 15.

This representation may be:

sequential (FM=00) if the quartets to be analysed follow immediately one after the other in the header stored in the memory 15, absolute (FM=11) to denote the absolute position of the quartet independently of the sub-header being analysed (this is useful, for example, if it is necessary to return to the VC field of the ATM header when processing the IP header in multicast applications), differential (FM=10) in order to express the position of the next quartet relative to the current quartet, which is useful if the length of certain headers is not known a priori (for example in the <<other>> state), relative (FM=01) in order to express the position of the next quartet relative to a given location of the buffer memory 15, located by an offset value managed by the controller 16. This value OFFSET typically denotes the start of the sub-header currently being analysed. The controller 16 manages it by adding, during state transitions, the header length corresponding to the previous state.

The other tasks carried out by the controller 16 include the error checks based on the <<checksum>> field of the IPV4 header and any manipulations in the TOS and TTL fields of the IP header. Any such modifications are performed at the end of the analysis process on the basis of the parameters supplied by the TRIE memory with the forwarding reference. These parameters are contained in a two bit field TT and in an eight bit field PA of each elementary cell containing a forwarding reference (FIG. 6). The coding is, for example, as follows:

TT=00: no modification to the TTL and TOS fields (can be used for packets destined for the host computer 11);

TT=01: decrement TTL by 1;

TT=10: decrement TTL by the contents of the PA field;

TT=11: decrement TTL by 1 and replace TOS with the contents of the field PA.

Upon a <<ATM>> or <<MPLS>> or <<other>> to <<IP>> state transition in version 4, the controller 16 checks to ensure that the contents of the <<checksum>> field of the IPV4 header are consistent with the remainder of the header depending on the error detection coding applied in these headers in accordance with the specifications. Upon a <<IP>> to <<inactive>> state transition (CT=001), the controller 16 updates the <<checksum>> field of the IPV4 header by summing that contained in the incoming header and the error detection code calculated on the basis of the modifications applied to the TTL and/or TOS fields.

Figure 7:
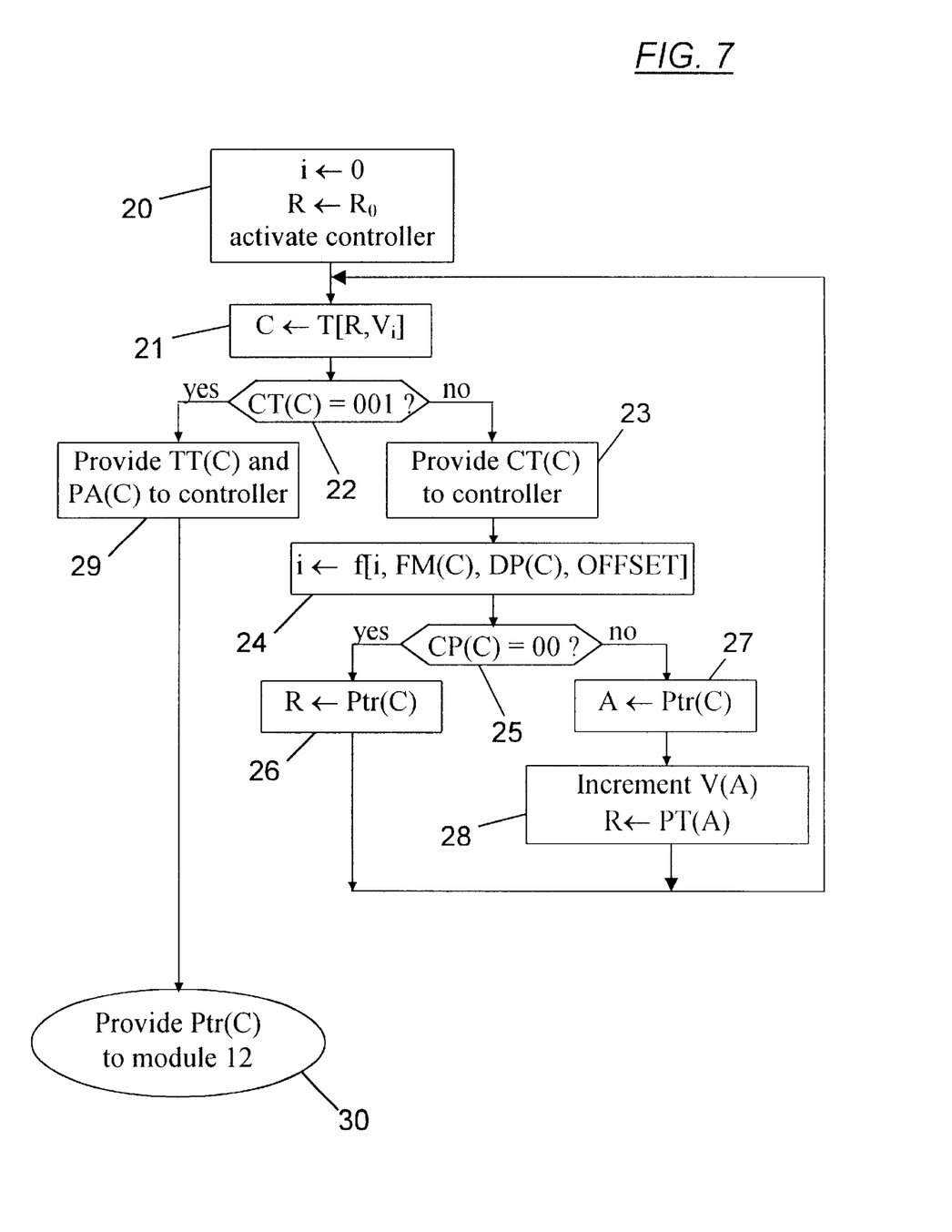
FIG. 7 is a flow chart illustrating an analysis procedure as proposed by the invention in order to look up a TRIE memory.

FIG. 7 gives a flow chart illustrating an analysis procedure that can be run by the module 13 in the examples described above. On initialisation 20, number i of the quartet analysed is set to 0 to indicate the start of the ATM header in the buffer memory 15, the base gate register $R_0$ is selected as the register R and the controller 16 receives an activate command (switch from <<inactive>> state to <<ATM>> state).

In each iteration i, the contents C of the elementary cell $T[R,V_i]$ of the selected register R, indicated by the (i+1)-th quartet $V_i$ of the header stored in the buffer memory 15, is read at step 21. If the command field CT(C) of this cell is not 001 (test 22), the contents of this command field are applied to the controller 16 at step 23 so that it will adopt, if necessary, the state changes needed to proceed with the corresponding actions, after which the module 13 determines how the analysis should continue by identifying the position in the buffer memory 15 of the next quartet to be analysed at step 24 and the next register of the TRIE memory which should be used to continue the analysis at steps 25 to 28.

At step 24, the code of the next quartet to be analysed is calculated as a function of the code of the current quartet i, the position code represented by the fields FM and DP of the cell in the TRIE memory and optionally by the parameter OFFSET managed by the controller 16. In accordance with the conventions outlined above, f may be expressed as:

f(i,00,DP,OFFSET)=i+1;

f(i,11,DP,OFFSET)=DP;

f(i,10,DP,OFFSET)=i+DP, where DP is positive or negative; and f(i,01,DP,OFFSET)=OFFSET+DP, where DP is positive or negative.

At step 25, the module 13 examines the field CP of the current cell of the TRIE memory in order to determine whether a count is necessary. If a count is not necessary (CP=00), the register designated by the pointer read from the field Ptr of the cell is selected as being register R for the subsequent iteration at step 26. If CP(C)≠0 at step 25, the address A of the counter to be incremented is obtained at step 27 as being the contents of the field Ptr of the current cell of the TRIE memory. At step 28, the module 13 then issues a command for this counter V(A) to be incremented and retrieves the pointer PT(A) in order to select the register R for the following iteration.

This analysis process continues by linking several logical analyses supplying intermediate statuses. It is terminated when the value 001 appears in the command field CT(C) of the current cell (test 22). At this point, the module 13 feeds to the controller 16 the parameters contained in the fields TT and PA of the cell at step 29, then provides the final status Ptr(C) to the forwarding module 12 at step 30.

We claim:

1. A method of associating forwarding references to data packets by means of a TRIE memory, which comprises analysing in succession, from different gate registers of the TRIE memory, different portions of a header of each packet, said header containing protocol data, wherein in response to the arrival of a packet, the header of said packet is stored in a buffer memory and a first portion of the stored header is analysed, wherein each analysis of a header portion of a packet produces either the forwarding reference associated with the packet or an intermediate reference containing a first code, making it possible to locate at any location of the buffer memory a next portion to be analysed, and a second code, making it possible to locate, at any location of the TRIE memory, a gate register from which said next portion is to be analysed, and wherein, after the first portion of a stored header has been analysed, subsequent portions of said header are analysed in accordance with the first and second codes contained in the intermediate references produced in succession until the forwarding reference is produced.

2. A method as claimed in claim 1, wherein the TRIE memory comprises elementary cells, each having a field indicating whether the cell contains a forwarding reference, and wherein each elementary cell which does not contain a forwarding reference has at least a first field to contain a piece of information designating a location of the buffer memory at which the analysis is to be continued and a second field to contain a piece of information designating a continue analysis register of the TRIE memory.

3. A method as claimed in claim 2, wherein said information designating a location of the buffer memory at which the analysis is to be continued contains a format code indicating a numerical representation of said location of the buffer memory and an address code designating said location of the buffer memory in accordance with said representation.

4. A method as claimed in claim 3, wherein the format code indicates (i) a sequential representation whereby the data elements of the stored header are analysed in the order in which they appear, (ii) an absolute representation whereby the next data element to be analysed is designated by its absolute position in the stored header, (iii) a differential representation whereby the next data element to be analysed is designated by its position relative to the data element currently being analysed or (iv) a relative representation whereby the next data element to be analysed is designated by its position relative to a given portion of the stored header.

5. A method as claimed in claim 2, wherein each elementary cell which does not contain a forwarding reference has an additional field which contains a piece of information indicating whether a counting operation is necessary and wherein each elementary cell which does not contain a forwarding reference and whose additional field indicates that a counting operation is necessary has, in its second field, a pointer to a memory location containing a counter to be incremented when said operation is performed and associated with another memory location containing a pointer to the continue analysis register of the TRIE memory.

6. A method as claimed in claim 1, wherein each elementary cell of the TRIE memory has a command field which contains instructions for an auxiliary controller.

7. A method as claimed in claim 6, wherein a forwarding reference is issued from the TRIE memory with parameters applied to the controller so as to specify any amendments to be applied on a portion of the header of the packet stored in the buffer memory.

8. A packet processing device having a circuit for analysing the header of packets received, using an associative TRIE memory having a plurality of gate registers, said headers containing protocol data, said circuit comprising a buffer memory, means for storing the header of each arriving packet in the buffer memory and means for analysing in succession, from different gate registers of the TRIE memory, different portions of each stored header from a first portion of the stored header, wherein said means for analysing are arranged to produce, upon each analysis of a header portion of a packet, either a forwarding reference associated with the packet or an intermediate reference containing a first code, making it possible to locate at any location of the buffer memory a next portion to be analysed, and a second code, making it possible to locate, at any location of the TRIE memory, a gate register from which said next portion is to be analysed, whereby after the first portion of a stored header has been analysed, subsequent portions of said header are analysed in accordance with the first and second codes contained in the intermediate references produced in succession until the forwarding reference is produced.

9. A packet processing device as claimed in claim 8, wherein the TRIE memory comprises elementary cells, each having a field indicating whether the cell contains a forwarding reference, and wherein each elementary cell which does not contain a forwarding reference has at least a first field to contain a piece of information designating a location of the buffer memory at which the analysis is to be continued and a second field to contain a piece of information designating a continue analysis register of the TRIE memory.

10. A packet processing device as claimed in claim 9, wherein said information designating a location of the buffer memory at which the analysis is to be continued contains a format code indicating a numerical representation of said location of the buffer memory and an address code designating said location of the buffer memory in accordance with said representation.

11. A packet processing device as claimed in claim 10, wherein the format code indicates (i) a sequential representation whereby the data elements of the stored header are analysed in the order in which they appear, (ii) an absolute representation whereby the next data element to be analysed is designated by its absolute position in the stored header, (iii) a differential representation whereby the next data element to be analysed is designated by its position relative to the data element currently being analysed or (iv) a relative representation whereby the next data element to be analysed is designated by its position relative to a given portion of the stored header.

12. A packet processing device as claimed in claim 9, wherein each elementary cell which does not contain a forwarding reference has an additional field which contains a piece of information indicating whether a counting operation is necessary and wherein each elementary cell which does not contain a forwarding reference and whose additional field indicates that a counting operation is necessary has, in its second field, a pointer to a memory location containing a counter to be incremented when said operation is performed and associated with another memory location containing a pointer to the continue analysis register of the TRIE memory.

13. A packet processing device as claimed in claim 8, further comprising an auxiliary controller, and wherein each elementary cell of the TRIE memory has a command field for containing instructions for the auxiliary controller.

14. A packet processing device as claimed in claim 13, wherein a forwarding reference is issued from the TRIE memory with parameters applied to the controller so as to specify any amendments to be applied on a portion of the header of the packet stored in the buffer memory.

* * * * *